United States Patent [19]

Young

[11] Patent Number: 4,981,306

[45] Date of Patent: Jan. 1, 1991

[54] BICYCLE HARNESS

[76] Inventor: Leparis D. Young, 30057 Avenidia Tranquila, Rancho Palos Verdes, Calif. 90274

[21] Appl. No.: 330,294

[22] Filed: Mar. 29, 1989

[51] Int. Cl.⁵ .............................................. A62B 35/00
[52] U.S. Cl. .................................... 280/290; 297/484
[58] Field of Search ................ 280/290, 223; 297/484, 297/485

[56] References Cited

U.S. PATENT DOCUMENTS

| | | | |
|---|---|---|---|
| 482,271 | 9/1892 | Openshaw | 280/290 |
| 579,002 | 3/1897 | Merrill | 280/290 |
| 635,683 | 10/1899 | Herman | 280/290 |
| 636,108 | 10/1899 | Blackman | 280/290 |
| 638,861 | 12/1899 | Bean | 280/290 |
| 3,062,585 | 11/1962 | Bentley | 297/484 |

FOREIGN PATENT DOCUMENTS

| | | | |
|---|---|---|---|
| 249778 | 8/1931 | Italy | 280/290 |
| 463159 | 4/1951 | Italy | 280/290 |

*Primary Examiner*—Mitchell J. Hill
*Attorney, Agent, or Firm*—Roth & Goldman

[57] ABSTRACT

An improved bicycle harness for harnessing a rider to a bicycle includes a connector or collar portion, positioned at the riders rear buttocks and crouch area, for releasible slideable coupling engagement to the seat's forwardly extending tongue. The collar slides onto the collars or ensleeves at least a portion of the bicycles seat's tongue, permitting upwardly vertically and/or rearwardly directed forces on the collar, exerted by the rider through other portions of the harness, to, respectively, pull upwardly against the seat tongue and/or push against the main body of the seat as a backstop. In one embodiment the other portion of the harness includes straps that extend from the collar and extend around the riders shoulders, allowing the rider to pedal in either a sitting or standing position while remaining effectively tethered by the bicycle seat. When the rider moves forward sufficiently relative to the bicycle seat, the collar releases from engagement with the seat, simply sliding off the front end of the tongue, and frees the rider from the connection to the bicycle as would be desired upon dismounting or in the event of an accidental fall.

15 Claims, 2 Drawing Sheets

BICYCLE HARNESS

FIELD OF THE INVENTION

This invention relates to a harness strap for holding a bicycle rider to the seat of a bicycle while pedaling the bicycle in either a sitting, or standing position.

BACKGROUND AND SUMMARY

The bicycle harness enables the rider to use his leg and back muscles in addition to his body weight and thus push harder on the pedals while being tethered to the bicycle seat. In this manner the biker is able to achieve higher speeds and greater acceleration than would otherwise be possible.

Without the use of the harness the maximum power that a bicycle rider can deliver to the pedals is limited by his body weight. It is possible to achieve a greater force should the rider stand while pedaling while at the same time pulling on the handle bars. The rider is attempting to pull on the handle bars while pushing on the pedals and in this way generate a force greater then his body weight. For all practical purposes, the force generated by the rider is limited by the body weight of the bicycle rider.

In the present invention, a bicycle harness tethers the rider to the bicycle seat as a back stop, thereby allowing the bicycle rider to impart a greater leg pushing force against the pedal which force is not limited to the weight of the rider. In other words, the body harness anchors the body to the bicycle seat while the rider utilizes his leg muscles and his back muscles to exert a force against the pedals that is not limited by the weight of the rider, but is limited only by the force generated by the back muscles and the leg muscles of the rider while he is tethered to the seat of the bicycle. The total force generated by the rider against the pedals is a function not only of the weight of the rider but also his back, shoulders and his leg muscles.

The bicycle harness performs a collar that is adapted to slideably fit over the tongue of the bicycle seat, thereby allowing the harness to be easily removed from the seat of the bicycle in the event the rider desires to dismount, or is otherwise separated from the bicycle in the event of an accident.

In the preferred position, the bicycle rider normally sits on the bicycle seat while pedaling the bicycle. The bicycle harness contains a right strap and a left strap that encircle the body of the rider and distributes the force generated by the rider in his leg muscles, his back and his shoulders on to the pedals.

The concept of using a strap that is tethered to the bicycle to allow the rider to apply a greater force to the pedals of the bicycle than could otherwise be achieved has been generally earlier recognized in the prior art when bicycles was more popularly accepted as a means of locomotion.

A review of Patent Number 635,683, issued to Herman and entitled "Harness Attachment for Bicycle" was patented Oct. 24, 1899 and illustrates a harness located around the shoulders of the rider, which harness contains a single point attachment at the rear of the bicycle. The harness is attached to a release mechanism that must be actuated by the rider in the event he seeks to dismount, or is forcibly ejected from a bike. The strap itself is fixedly attached to the bike making it necessary for the rider to physically energize the release mechanism in order to disengage himself from the bike. The strap arrangement also prevents the rider from riding the bike in the conventional, low handled bar position as is used by riders today because of the strap restraints on the shoulders of the rider. In other words, the bicycle rider in the Herman Patent must ride the bike in a sitting position only, and not in a forward position as is desired by most modern bicycle riders.

Patent Number 482,271, to Openshaw and Carr and patented Sep. 6, 1892 also disclose a harness adapted to fit around the shoulders of the rider and in which the harness is tethered to the bicycle. The harness disclosed in the Openshaw patent is tethered in the front and is arranged in such a manner that should the rider lean forward, the harness is untethered from the bicycle, thereby forcing the rider to use the harness only in a sitting position. The Openshaw harness also encircles the rider, thereby placing a force on the rider's chest while he is pedaling, which is undesirable when pedaling the bicycle.

Patent Number 579,002 issued to Merrill and patented Mar. 16, 1897 also discloses a harness that is wrapped around the shoulders of the rider and which is tethered in the rear of the bicycle frame. By definition, the rider must ride the bicycle in a sitting up position, since the strap around his shoulders prevent him from leaning forward. These strap mechanisms also incorporate a device for raising and lowering the seat of the bicycle, as the rider pedals, attempting, in this way, to generate more force on the pedals as the rider propels the bicycle.

Patent Number 638,861 issued to Bean and patented Dec. 12, 1899 discloses a two strap harness, extending from the rear of the bicycle over the shoulder of the rider and connected to the handle bar in front of the rider. The obvious intention is to allow the rider to generate a greater force on the pedals against the straps located on the shoulder of the rider. Unfortunately, the harness arrangement must be kept taut at all times, or the forward straps will become released from the handle bar. In addition, the rider can not stand up and pedal and is severely limited in his actions as he rides the bike.

Patent Number 636, 108 issued to Blackman on Oct. 31, 1899 also discloses a harness connecting the rear of the bicycle seat to the front handle bar portion of the bicycle and in which the straps extends over the shoulder of the rider. Here again, the rider of the bicycle is limited in his position in that he can not stand up on the pedals and must, at all times, keep pressure on the straps in order to prevent them from being released from the handle bar portion. It would appear that the rider bending forward and releasing tension on the strap would allow the strap to be released from the handle bar portion. The same feature prevents the rider from assuming a standing position when pedaling the bicycle.

The Patents cited above appeared to represent the best art applicable to the use of a harness on a bicycle for the purpose of allowing the rider to generate a force greater then his body weight against the pedals.

In the present invention, the bicycle harness is attached to the bicycle at only one location and that is, along the forward tongue of the bicycle seat. In this fashion, the rider may assume any position, such as standing on the pedals, sitting upright, or even leaning forward without losing any benefit of the harness system.

The, since the strap assembly forms a seat collar that slideably fits over the tongue of the bicycle seat. Should the bicycle rider wish to dismount, he simply moves forward, to allow the collar portion to slide off the front of the seat, thereby automatically disengaging the rider from the bicycle. Similarly, should a mishap occur and the rider fall from the bike, the collar portion of the harness will again slide forward, automatically disengaging the harness from the bicycle.

In accordance with more specific aspects, the harness strap comprises a strap assembly that forms a seat collar that is adapted to slideably fit over the tongue of the bicycle seat to thereby serve as a connector or connector means, as variously termed. A first strap is connected to the strap assembly and extends from the right side of the collar along the right side of the back of the rider and over the right shoulder and down the right front chest of the rider and terminates on the first strap at an acute angle at a point remote from the collar. This generates a transverse force on the first strap to the right side of the collar.

A second strap is connected to said strap assembly and extends along the left side of the collar and along the left side of the back of the rider over the left shoulder and down the left front chest, terminating on the second strap at an acute angle and at a point remote from the collar, generating a transverse force on the second strap to the left side of the collar.

A lower transverse strap extends across the lower back of the rider, from the first strap to the second strap. The lower transverse strap contacts the first strap and the second strap at a point where the right strap and the second strap terminate at said acute angle, thereby allowing the transverse strap to balance the left and right transverse forces generated on the strap. This action tends to keep the straps on the outside of the buttocks of the rider and helps to distribute the forces across the buttocks of the rider and across the back of the rider.

An upper, transverse strap extends across the upper back of the rider, connecting said first strap on the right side of the rider to the second strap on the left side of the rider, thereby holding the right and left straps on the shoulder of the rider while he is pedaling the bicycle.

In the preferred embodiment, a flexible seat portion is connected between the lower transverse strap and the strap assembly and terminates at the seat collar and thereby acts to hold the right and left back strap in the preferred position while the rider is pedaling the bicycle.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF A PREFERRED EMBODIMENT

Figure 1:
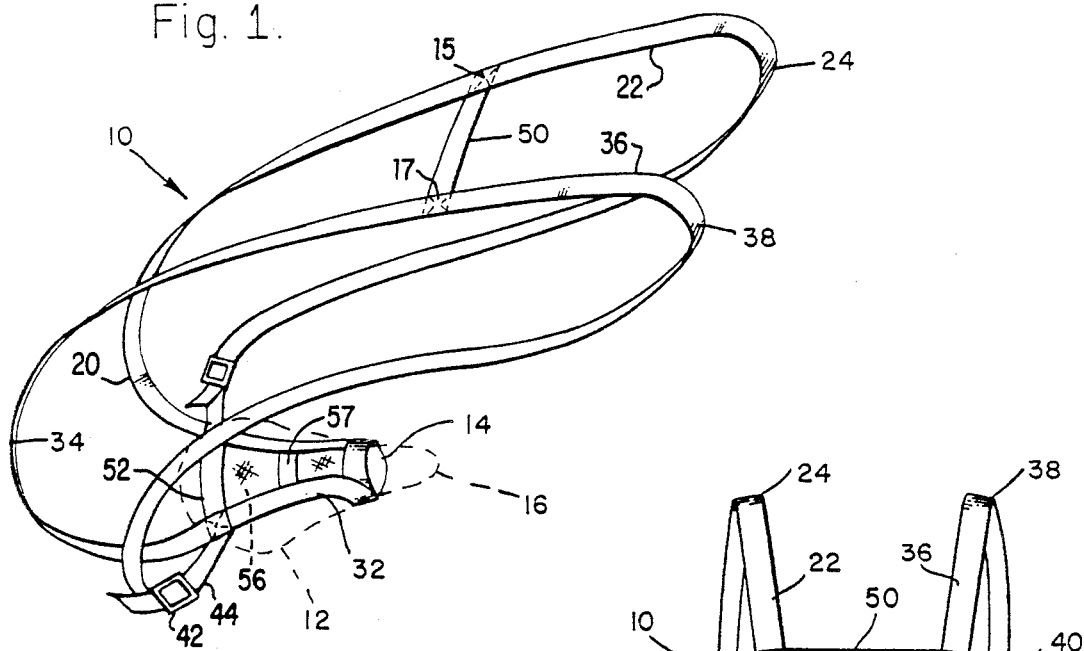
FIG. 1 is a prospective view of the bicycle harness strap.
Figure 3:
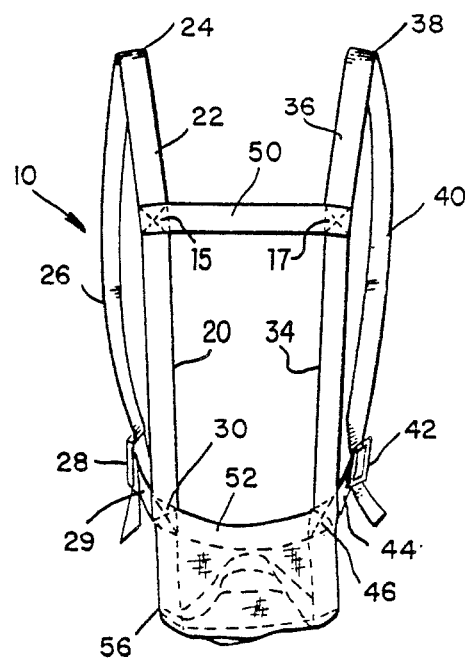
FIG. 3 is a rear view of the bicycle harness strap illustrated in FIG. 1.
Figure 2:
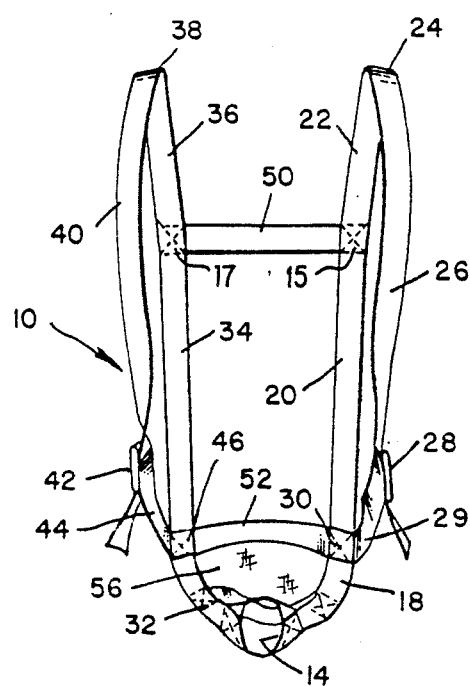
FIG. 2 is a front view of the bicycle harness strap illustrated in FIG. 1.

REference is made to the preferred embodiment of the invention depicted in FIGS. 1, 2, and 3, which may be considered together, that illustrated the embodiment in perspective view, front view and in rear view respectively, of a harness strap 10, tethered to a bicycle seat 12, by means of a seat collar 14, that is adapted to slideably fit over the tongue 16, of the seat 12. As shown the seat is of a conventional structure; the seat contains the tongue at the front of the seat and the tongue extends from the seat's main body portion at the rear, with the main body portion at the rear, with the main body portion having a grater width and/or height dimension than the tongue as is better represented in FIGS. 4 and 5 to which brief reference may be made.

The collar portion 14, is connected to a first strap 18, that follows the contour of the seat 12, on the left side and extends rearwardly to point 20 around the buttocks of the rider and up the left side of the back of the rider, as at 22, over the left shoulder of the rider, as at 24, and down the front chest on the left side of the rider, as at 26, to buckle 28. The strap continues from buckle 28, as at 29 and attaches to strap 18 at point 30, that is located remote and to the rear of seat collar 14. Thus the strap forms a first loop, terminating at point 30.

In a similar fashion, a strap 32 is attached to the seat collar 14, and extends along the right side of the seat 12, and extends rearwardly over the right buttocks of the rider as at point 34 and extends up the back of the rider on the right side as at point 36, around the right shoulder of the rider as at point 38 and extends down the front of the rider on the right side as at 40, to a buckle 42, and a strap 44 extending from the buckle 42. The strap 44 attaches to strap 32 at an acute angle at point 46 that is located to the rear and remote from the seat collar 14. This forms a second loop as illustrated, terminating at location 36. The attaching point 46, is substantially opposite attaching point 30.

An upper transverse strap 50, a third strap means, connects the left back strap 18, with the right back strap 32, thereby keeping the straps on the left and right shoulder of the rider, respectively. A lower transverse strap 52, a fourth strap means, interconnects strap 18 with strap 32 at points 30 and 46 respectively. The lower strap 52 serves the function of balancing the transverse forces generated by strap 29 and strap 44. The portion of the strap 18 located between location 30 and collar 14 may be referred to as a fifth strap portion or fifth strap means, while the portion of strap 32 located between location 46 and collar 14 may be referred to as a sixth strap portion or sixth strap means.

A review of the structure cf the harness will show that the left strap 18 forms a loop that completely encircles the left side of the rider and ties back through the buckle 28, to the left strap 18 at point 30 to form a first mechanical coupling to the rider whereas in a similar fashion the right strap 32 forms a loop that encircles the right side of the rider to form a second mechanical coupling to the rider, which strap is again tied on to the right strap 32, at point 46. In this fashion, the rider is tethered to the seat 16 at equal and opposite points which has the effect of generating asymmetrical forces by strap 29 on the left side and strap 44 on the right side. These asymmetrical forces are balanced out by the lower transverse strap 52, which has the effect of maintaining the strap portions 18 and 32 in a spaced apart relationship on the seat 12.

In the preferred embodiment, a flexible cloth covering 56 covers the seat collar 14 and extends rearwardly between harness 18 and 32 and terminates at the lower transverse strap 52.

It is important to note that there is no transverse strap in

The flexible cloth as shown has a portion that fits atop the seat and holds the adjacent side straps 18 and 32.

Further an additional transverse strap 57 may be added to provide additional support for maintaining straps 18 and 32 supported on the seat when the rider is seated.

It is important to note that there is no transverse strap in the front of the rider attaching straps 26 on the left side and strap 40 on the right side such a strap on the front of the rider would inhibit the rider from either assuming a sitting position or a standing position when using the harness 10 as described.

FIGS. 2 and 3 more fully illustrates how the buckle 28 and buckle 42 located on the right and left strap respectively can be used to adjust the harness depending on the physical size of the rider.

The only attachment of the harness to the bicycle is by means of the seat collar 14 which is adapted to slideably fit over the top of the tongue 16 of seat 12. In this fashion, the rider may either stand on the pedals or sit on the seat while operating the bike.

As earlier herein stated the strap assembly forms the collar. As shown in FIG. 2, the collar may be formed of two strap portions, not separately labeled in the figure, sewn together, as represented in dash lines, to define a passage to receive and collar the bicycle seat neck, as illustrated. These strap portions may be referred to as the seventh and eight strap means, respectively.

Figure 4:
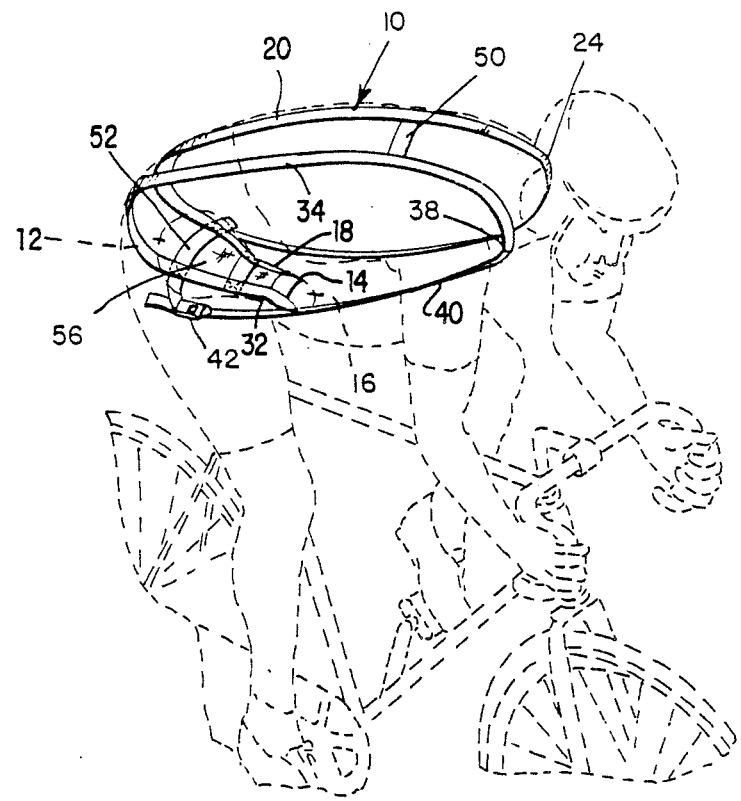
FIG. 4 illustrates the bicycle harness strap used by a rider in the leaning forward position.

REferring now to FIG. 4, there is shown and illustrated a bicycle rider using the harness 10 as illustrated in FIGS. 1, 2 and 3 in the sitting position which is sometimes called the racing position. Since the harness is attached to the bicycle seat at only one point, namely the seat collar, it can be shown that the rider may assume any position on the bicycle without being impeded by the harness. FIG. 4 more fully illustrates how the rider may sit on the bike and lean far forward while pedaling the bike in the more approved racing position.

Figure 5:
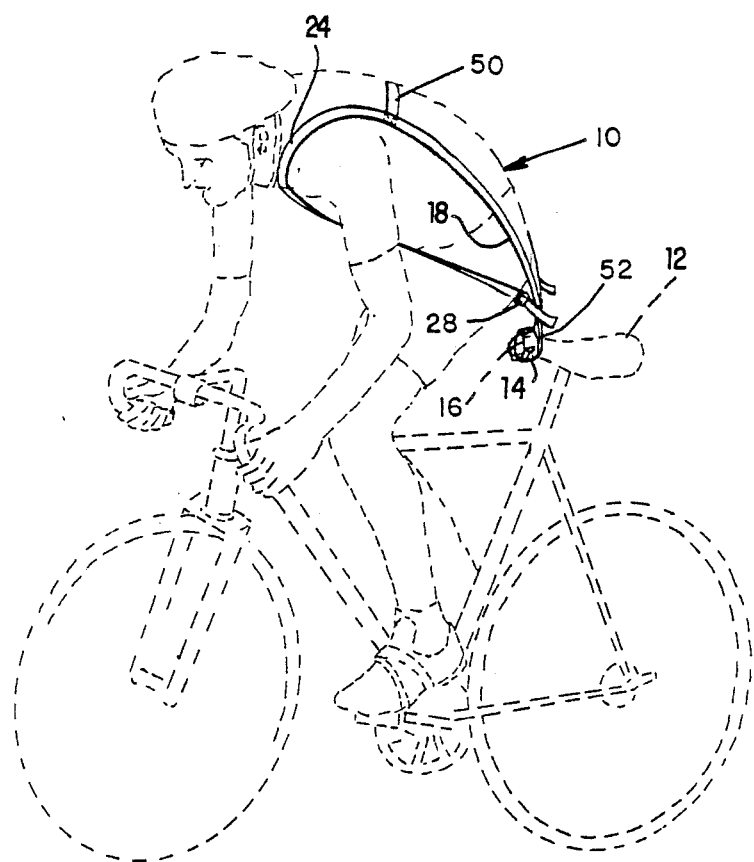
FIG. 5 illustrates the bicycle harness strap used by a rider in the standing, pumping position.

Referring now to FIG. 5 there is shown and illustrated a rider using the harness 10 as illustrated in FIGS. 1, 2 and 3 and in which the rider is standing on the pedals while still being tethered to the seat by means of the harness 10. The standing position as illustrated in FIG. 5, is used by riders when attempting to exert greater force on the pedals during a sprint or while climbing hills or when making an extra burst of energy for passing purposes.

Because the harness 10, is tethered to the bicycle at only one point, namely the tongue of the seat, it becomes apparent that the bicycle rider may assume any position while operating the bike and without restriction, while at the same time achieving all the benefits of the harness which is to exert a greater force on the pedals of the bicycles which force is greater than the weight of the rider alone.

As is clear from the foregoing description any suitable available material may be used in the construction of the novel harness. An example is the common nylon material as is used for fabric and straps.

As is shown, when the rider is seated and bracing his body against the seat while pedaling the bicycle the cooling exerts force in a rearward direction as causes stress on the seat and thereby on the seat tube, which supports the seat to the bicycle frame. When the rider is pedaling the bicycle in a position off the seat, standing so to speak, the cooling produces an upward force on the tongue of the seat. In turn that force produces a mechanical moment at the seat tube as stresses the seat tube. In one high quality bicycle used by racers the sturdiness of seat and seat tube construction appear to withstand the extra stresses produced by the harness. As those skilled in the art appreciate, however, all seats and seat tubes will not necessarily withstand those additional forces. Accordingly the user of my invention, the cyclist who wishes to extend capabilities into new areas of personal challenge and endurance, should test the harness with a specific bicycle and check to ensure that the seat or the seat tube does not bend under the maximum force that such person is capable of exerting and to examine the seat and tube after each use to ensure that those bicycle components are not weakening or failing. It is anticipated that with demand created through use of the harness, bicycle manufacturers will respond with even stronger designs and materials for more rugged seat and seat tube construction as will permit the strongest bicycle riders to apply maximum forces permitted by the harness without causing any damage to the seat and seat tube, enhancing the sport of cycling.

It is believed that the foregoing description of the preferred embodiment of my invention is sufficient in detail to enable one skilled in the art to make and use the invention. However, it is expressly understood that the detail of the elements which is presented for the foregoing purpose is not intended to limit the scope of the invention in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A bicycle harness for holding a bicycle rider to a bicycle during operation of the bicycle comprising:
    a strap collar sized to slideably fit onto and off the tongue of a bicycle seat as a single attachment of said harness to a bicycle;
    a first strap connected at a first location to and extending from at least the left side of said collar and sized to extend in a loop along the left side of the back of the rider, over the left shoulder, down the left front chest and terminating on said first strap at an acute angle therewith and at a location thereof spaced from said collar for generating a transverse force on said first strap to the left;
    a second strap connected at a first location to and extending from at least the right side of said collar and sized to extend in a loop along the right side of the back of the rider, over the right shoulder, down the right front chest and terminating on said second strap at an acute angle thereto and at a location thereof spaced from said collar for generating a transverse force on said second strap to the right;
    a lower transverse strap sized to extend across the lower back of the rider between said first strap on the right side and said second strap on the left side, with said lower transverse strap being connected to said first and second straps at said location along each of said first and second straps where said first strap terminates at said acute angle and where said second strap terminates at aid acute angle for balancing the left and right transverse forces generated on said straps; and an upper transverse strap extending across the upper back of the rider connecting said first strap on the left side of the rider to said second strap on the right side of the rider for holding said first and second straps on the shoulders of the rider.

2. A bicycle harness comprising:

a collar to sized to slideably fit onto and off the tongue of a bicycle seat as a single attachment of said harness to a bicycle;

a first strap connected to and extending from the left side of said collar and sized to extend along the left side of the back of the rider, over the left shoulder, down the left front chest and terminating on said first strap at an acute angle and at a point remove of said collar for generating a transverse force on said first strap to the left;

a second strap connected to and extending from the right side of said collar and sized to extend along the right side of the back of the rider, over the right shoulder, down the right front chest and terminating on said second strap at an acute angle and at a point remote of said collar for generating a transverse force on said second strap to the right;

a lower transverse strap sized to extend across the lower back of the rider from said first strap on the right side and at a point where said first strap and said second strap terminate at said acute angle for balancing the left and right transverse forces generated on said straps;

an upper transverse strap extending across the upper back of the rider connecting said first strap on the right side of the rider to said second strap on the right side of the rider for holding said first and second straps on the shoulders of the rider; and a flexible seat portion connected between said lower transverse strap and said first and second strap and terminating at said collar for holding said first and second straps.

3. A harness according to claim 1 further including an adjusting buckle located in said first strap and an adjusting buckle in said second strap for adjusting said first and second straps with respect to said collar.

4. A harness according to claim 1 in which said collar is defined by extended portions of first strap and said second strap with said portions of said straps being connected together to define a seat tongue receiving passage between said connected extended strap portions whereby said collar is integral with said first and second straps.

5. The invention as defined in claim 1 wherein said collar comprises: a strap assembly.

6. The invention as defined in claim 5 wherein said strap assembly further comprises a portion of each of said first and second straps, said strap portions being connected together at two spaced locations to define a seat tongue receiving passage between said two spaced locations.

7. A bicycle harness comprising:

connector means sized to slideably engage on and disengage from the tongue of a bicycle seat for providing a single attachment of said harness to a bicycle; and body engagement means connected to said connector means for engagement on the body of a bicycle rider so that the rider can attach himself to a bicycle by engaging said connector means with the tongue of a bicycle seat and may disengage himself from connection to the bicycle by sliding said connector means off of the tongue of the bicycle seat.

8. The invention as defined in claim 7 wherein said body engagement means comprises:

first strap means defining a first loop;

second strap means defining a second loop;

third strap means extending between and having opposed ends joined respectively at corresponding junctures on each of said first and second strap means;

fourth strap means extending between and having opposed ends joined respectively at corresponding junctures on each of said first and second strap means; said fourth strap means being spaced from said third strap means; and means connecting said connector means to said first and second strap means.

9. The invention as defined in claim 8 wherein said means connecting said connector means to said first and second strap means comprises further:

fifth strap means connecting said juncture of said fourth strap means and said first strap means to a first location on said connector means; and sixth strap means connecting said juncture of said fourth strap means and said second strap means to a second location on said connector means.

10. The invention as defined in claim 9 wherein said connector means comprises further: seventh strap means and eighth strap means, said seventh and eighth strap means being connected together at two spaced locations to define a passage therebetween for partially ensleeving and receiving said seat tongue.

11. The invention as defined in claim 10 further comprising: a layer of flexible material connected between and bridging any space between said fifth and sixth strap means.

12. In a bicycle harness of the type including first means for applying a first mechanical coupling to a rider and a second means for providing a second mechanical coupling to a bicycle with the first means being connected to said second means to harness a rider to a bicycle, with said bicycle being of the type containing a seat and with such seat including an elongate tongue attached to and extending toward the front of the bicycle from a seat main body portion, said seat main body portion being larger in size than said seat tongue, the improvement wherein said second means comprises:

collar means for slideably engaging and coupling to at least a portion of said tongue.

13. The invention as defined in claim 12 wherein said collar means includes a passage for receiving therewithin and ensleeving at least a portion of said tongue, said passage being of a size great enough to fit over said tongue but insufficient in size to fit over said seat main body portion.

14. The invention defined in claim 12 wherein said collar means is also slideably disengageable from said seat tongue.

15. For use by a bicycle rider with a bicycle of the type containing a seat with such seat including an elongate tongue at the seat front attached to and extending forwardly toward the front of the bicycle form a main body portion of the seat at the rear of the seat, with said main body portion being larger in size than said tongue, an improved bicycle harness of the type including the first coupling means for coupling to a bicycle rider and a second coupling means for cooling to a bicycle to harness the rider to the bicycle, with said first cooling means being coupled to said second coupling means to transmit force between the rider and the bicycle, the improvement in which said second coupling means comprises:

connector means for slideably engaging and cooling to said seat tongue, said connector means being slidable onto said tongue responsive to a force thereon applied in a direction toward said seat main body portion and maintaining coupling with said seat responsive to forces applied thereon in a direction orthogonal to and toward said seat main body portion, and said connector means being disengageably from said tongue responsive to a force applied thereto in a direction toward the front of the bicycle.

* * * * *

UNITED STATES PATENT AND TRADEMARK OFFICE
CERTIFICATE OF CORRECTION

PATENT NO. : 4,981,306
DATED : January 1, 1991
INVENTOR(S) : Leparis D. Young

It is certified that error appears in the above—identified patent and that said Letters Patent is hereby corrected as shown below:

In the Abstract, line 5, after "onto", delete "the" and substitute --and--. At column 2, line 67, delete the extraneous phrase ", since the". At column 3, line 58, and before line 59, insert the heading "--Description Of the Drawings" and then insert --In the Drawings:-- At column 4, line 4, "REference" should read --"Reference"--. At column 4, line 6, delete "illustrated" and substitute --illustrate--. At column 5, lines 7 and 8, delete the incomplete sentence: "It is important to note that there is no transverse strap in". At column 5, line 38, "REferring" should read --Referring--. At column 6, line 3, delete "cooling" and substitute --coupling--. At column 6, line 7, delete "cooling" and substitute --coupling--. At column 9, line 4, delete "cooling" and substitute therefore --coupling--. At column 9, line 5, delete "cooling" and substitute therefore --coupling--. At column 9, line 10, delete "cooling" and substitute --coupling--. At column 10, lines 7 and 8, delete the word bridging lines 7 and 8 "disengageably" and substitute "--disengageable--."

Signed and Sealed this

Twenty-fifth Day of May, 1993

Attest:

MICHAEL K. KIRK

Attesting Officer

Acting Commissioner of Patents and Trademarks